United States Patent
Terada et al.

(10) Patent No.: US 8,286,766 B2
(45) Date of Patent: Oct. 16, 2012

(54) VIBRATION REDUCING STRUCTURE FOR STEERING WHEEL

(75) Inventors: Masashi Terada, Saitama (JP); Takashi Kondou, Saitama (JP); Takahiro Uesaka, Saitama (JP); Yukihiro Kunitake, Saitama (JP); Morimasa Asai, Shizuoka (JP); Hideaki Saitou, Shizuoka (JP)

(73) Assignees: Honda Motor Co., Ltd., Tokyo (JP); Nihon Plast Co., Ltd., Shizuoka (JP)

( * ) Notice: Subject to any disclaimer, the term of this patent is extended or adjusted under 35 U.S.C. 154(b) by 381 days.

(21) Appl. No.: 12/321,974

(22) Filed: Jan. 27, 2009

(65) Prior Publication Data
US 2009/0218739 A1    Sep. 3, 2009

(30) Foreign Application Priority Data

Feb. 1, 2008 (JP) ................................. 2008-022557
Sep. 3, 2008 (JP) ................................. 2008-225619

(51) Int. Cl.
*F16F 7/10*    (2006.01)
(52) U.S. Cl. .................. 188/379; 267/140.4; 267/140.5; 280/731; 200/61.55
(58) Field of Classification Search .................. 188/378, 188/379, 380; 267/136, 140.3, 140.4, 140.5, 267/153; 280/728.2, 731; 200/61.54, 61.55
See application file for complete search history.

(56) References Cited

U.S. PATENT DOCUMENTS

| | | | |
|---|---|---|---|
| 3,756,551 A * | 9/1973 | Bishop ........................ | 267/141.1 |
| 5,410,114 A * | 4/1995 | Furuie et al. ............... | 200/61.55 |
| 6,354,622 B1 | 3/2002 | Ulbrich et al. | |
| 6,464,247 B1 | 10/2002 | Laue | |
| 6,592,141 B1 | 7/2003 | Dancasius et al. | |
| 7,264,097 B2 | 9/2007 | Yasumoto et al. | |
| 2006/0197323 A1 | 9/2006 | Pillsbury, IV et al. | |

FOREIGN PATENT DOCUMENTS

| | | |
|---|---|---|
| DE | 19653684 A1 | 6/1998 |
| JP | 4-169357 A | 6/1992 |
| JP | 4-262965 A | 9/1992 |
| JP | 2005-036845 A | 2/2005 |
| JP | 2006-96127 A | 4/2006 |
| KR | 2002-0031810 A | 5/2002 |

* cited by examiner

Primary Examiner — Robert A Siconolfi
Assistant Examiner — Vu Q Nguyen
(74) Attorney, Agent, or Firm — Carrier Blackman & Associates, P.C.; William D. Blackman; Joseph P. Carrier (57) ABSTRACT

A slider 24 is supported on a holder 19 of a steering wheel 11 via a coil spring 25 so as to be movable in a direction of an axis while an air bag module 20 is supported on a slider 24 via a damper spring 26 so as to be movable in a direction perpendicular to the axis. Since the coil spring 25 does not affect vibration of the air bag module 20 in the direction perpendicular to the axis, it is possible to set a spring constant of the coil spring 25 at a value appropriate for the operation of a horn switch 37, and to set a spring constant of the damper spring 26 at a value appropriate for the operation of the dynamic damper. As a result, it is possible to effectively reduce the vibration of the steering wheel 11 in the direction perpendicular to the axis with the dynamic damper without affecting the operability of the horn switch 37.

20 Claims, 10 Drawing Sheets

VIBRATION REDUCING STRUCTURE FOR STEERING WHEEL

BACKGROUND OF THE INVENTION

1. Field of the Invention

The present invention relates to a vibration reducing structure for a steering wheel in which: a mass is supported inside a steering wheel via an elastic body so as to be movable in a direction of an axis and a direction perpendicular to the axis of the steering wheel; a horn switch is activated by pressing the mass in the direction of the axis; and the mass is allowed to vibrate in the direction perpendicular to the axis so as to function as a dynamic damper.

2. Description of the Related Art

A steering wheel has been publicly known from Japanese Patent Application Laid-open No. 2006-96127, in which an air bag module is elastically supported via a coil spring inside the steering wheel; the pressing of a pad of the steering wheel by a driver compresses the coil spring in a direction of an axis direction so as to activate a horn switch; and an inflator of the air bag module is supported by another elastic body different from the coil spring so as to function as a dynamic damper.

Figure 10:
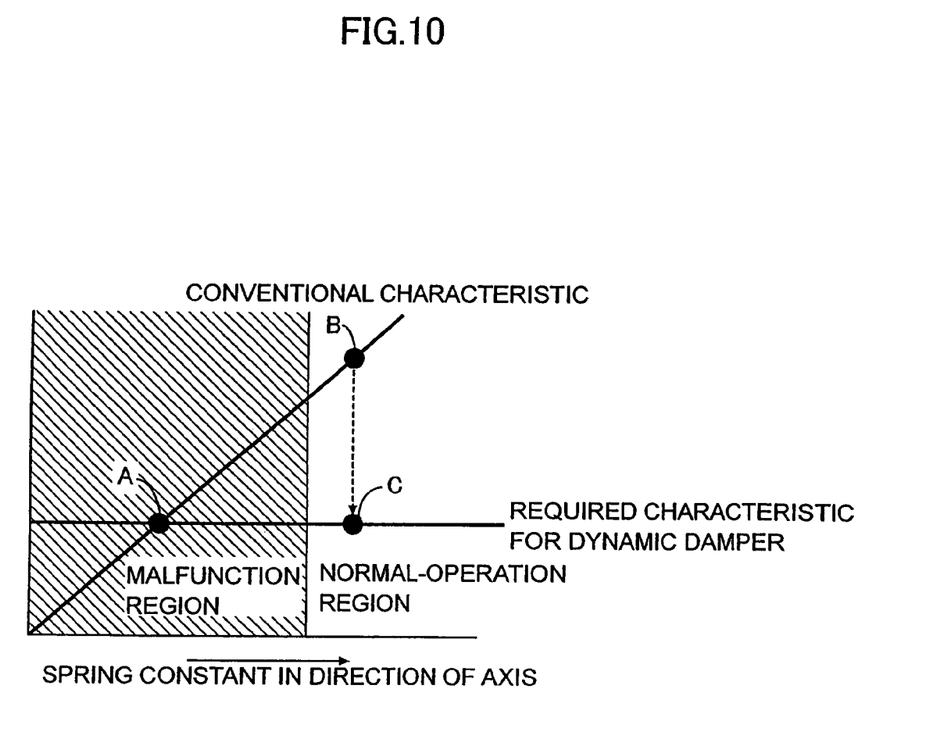
FIG. 10 is a graph explaining problems of a conventional example.

Meanwhile, Conventional Characteristic in FIG. 10 indicates a spring constant of a coil spring in a case where the coil spring is employed for both a horn switch and a dynamic damper. The stiffer the coil spring is, the larger the spring constant in a direction perpendicular to the axis becomes in proportion to an increase of the spring constant in the direction of the axis. A region with diagonal lines indicates a region where the horn switch malfunctions due to vibration because the spring constant in the direction of the axis is too small, and if a soft coil spring is employed so that the spring constants are set at a point A in the region with diagonal lines, the horn switch may possibly malfunction. In order to prevent this, if a stiffer coil spring is employed so that the spring constants are set at a point B outside the region with diagonal lines, the spring constant in the direction perpendicular to the axis becomes higher than the spring constant at a point C which allows the function as the dynamic damper to be effectively fulfilled. As a result, a problem may occur that the function as the dynamic damper cannot be effectively fulfilled. Accordingly, as with the above-described conventional example, if the air bag module is supported with a common coil spring both in the direction of the axis and the direction perpendicular to the axis, there is a problem that a good balance between the function as the horn switch and the function as the dynamic damper cannot be achieved.

SUMMARY OF THE INVENTION

The present invention has been made in the light of the above-mentioned circumstances, and it is an object thereof to effectively reduce vibration of a steering wheel with a dynamic damper without affecting the operability of a horn switch.

In order to achieve the object, according to a first feature of the present invention, there is proposed a vibration reducing structure for a steering wheel comprising a mass which is supported inside the steering wheel via an elastic body so as to be movable in a direction of an axis and a direction perpendicular to the axis, wherein a horn switch is activated by pressing the mass in the direction of the axis, and the mass is allowed to vibrate in the direction perpendicular to the axis to function as a dynamic damper, wherein the elastic body comprises a first elastic body and a second elastic body, a slider is supported on a fixed portion of the steering wheel via the first elastic body so as to be movable in the direction of the axis, and the mass is supported on the slider via the second elastic body so as to be movable in the direction perpendicular to the axis.

With the above-described configuration, the slider is supported on the fixed portion of the steering wheel via the first elastic body so as to be movable in the direction of the axis while the mass is supported on the slider via the second elastic body so as to be movable in the direction perpendicular to the axis. Accordingly, the driver can activate the horn switch by deforming the first elastic body so as to move the slider in the direction of the axis, and the mass vibrates in the direction perpendicular to the axis via the second elastic body with respect to the slider so as to fulfill the function as the dynamic damper, so that vibration of the steering wheel in the direction perpendicular to the axis can be reduced. In this event, since the first elastic body does not affect vibration of the mass in the direction perpendicular to the axis, it is possible to set the spring constant of the first elastic body at a value appropriate for the operation of the horn switch and to set the spring constant of the second elastic body at a value appropriate for the operation of the dynamic damper. As a result, it is possible to effectively reduce the vibration of the steering wheel in the direction perpendicular to the axis with the dynamic damper without affecting the operability of the horn switch.

According to a second feature of the present invention, in addition to the first feature, there is proposed the vibration reducing structure for steering wheel, wherein the direction perpendicular to the axis of the steering wheel comprises an up-and-down direction and a lateral direction and the second elastic body has different spring constants respectively in the up-and-down direction and the lateral direction.

With the above-described configuration, since the second elastic body, which supports the mass in a manner that the mass is movable in the direction perpendicular to the axis, has different spring constants respectively in the up-and-down direction and the lateral direction of the steering wheel, it is possible to individually tune the vibration absorbing characteristics respectively in the up-and-down direction and the lateral direction of the steering wheel.

According to a third feature of the present invention, in addition to the first or second feature, there is proposed the vibration reducing structure for steering wheel, wherein the mass is an air bag module.

With the above-described configuration, since the air bag module, which is provided inside the steering wheel, is utilized as the mass of the dynamic damper, there is no need to provide a dedicated mass. As a result, the configuration contributes to reduction in the number of components, the weight, the installation space, and the cost.

A holder 19 of embodiments corresponds to a fixed portion of the present invention; an air bag module 20 of the embodiments corresponds to a mass of the present invention; a coil spring 25 of the embodiments corresponds to an elastic body or first elastic body of the present invention; and a damper spring 26 of the embodiments corresponds to an elastic body or second elastic body of the present invention.

The above description, other objects, characteristics and advantages of the present invention will be clear from detailed descriptions which will be provided for the preferred embodiments referring to the attached drawings.

BRIEF DESCRIPTION OF THE DRAWINGS

FIGS. 1 to 5B show a first embodiment of the present invention;

FIGS. 6 to 7 show a second embodiment of the present invention;

DESCRIPTION OF THE PREFERRED EMBODIMENT

A first embodiment of the present invention will be explained below based on FIGS. 1 to 5B.

Figure 1:
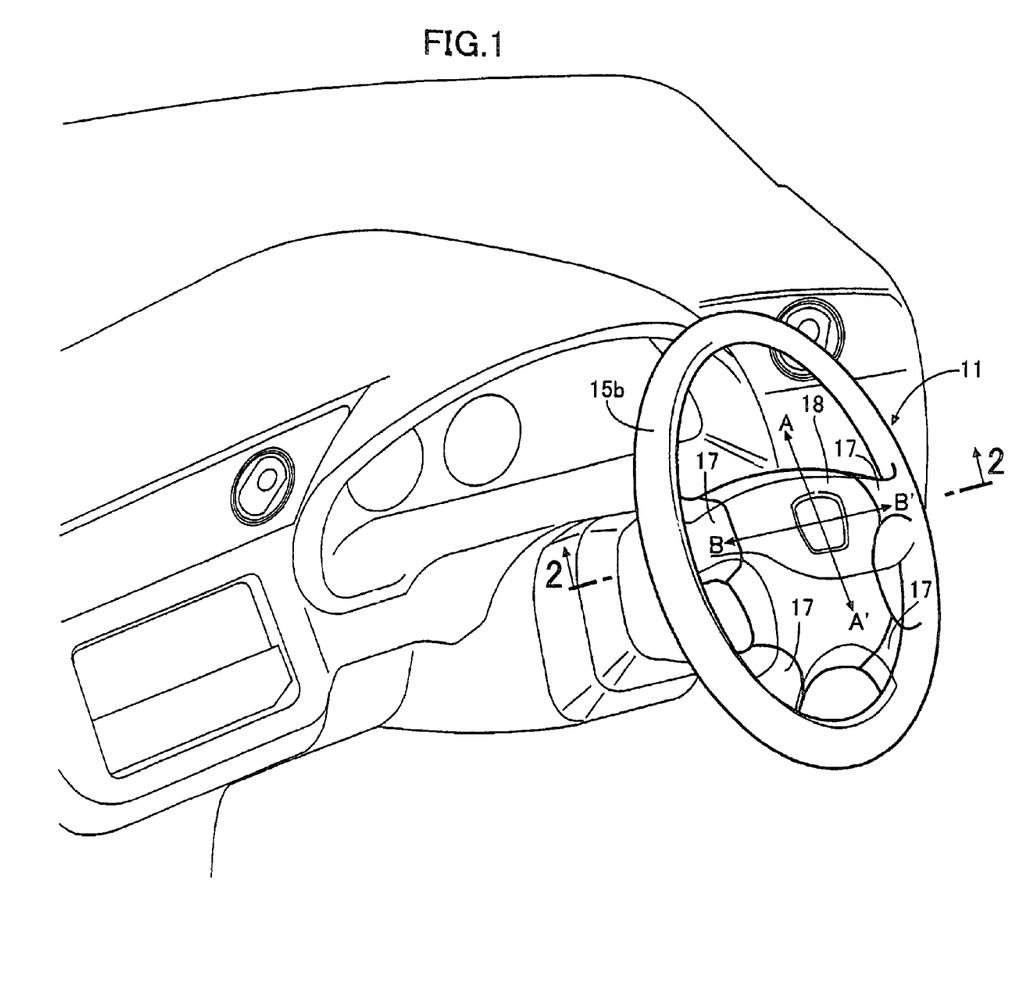
FIG. 1 is a perspective view of a steering wheel for an automobile.
Figure 2:
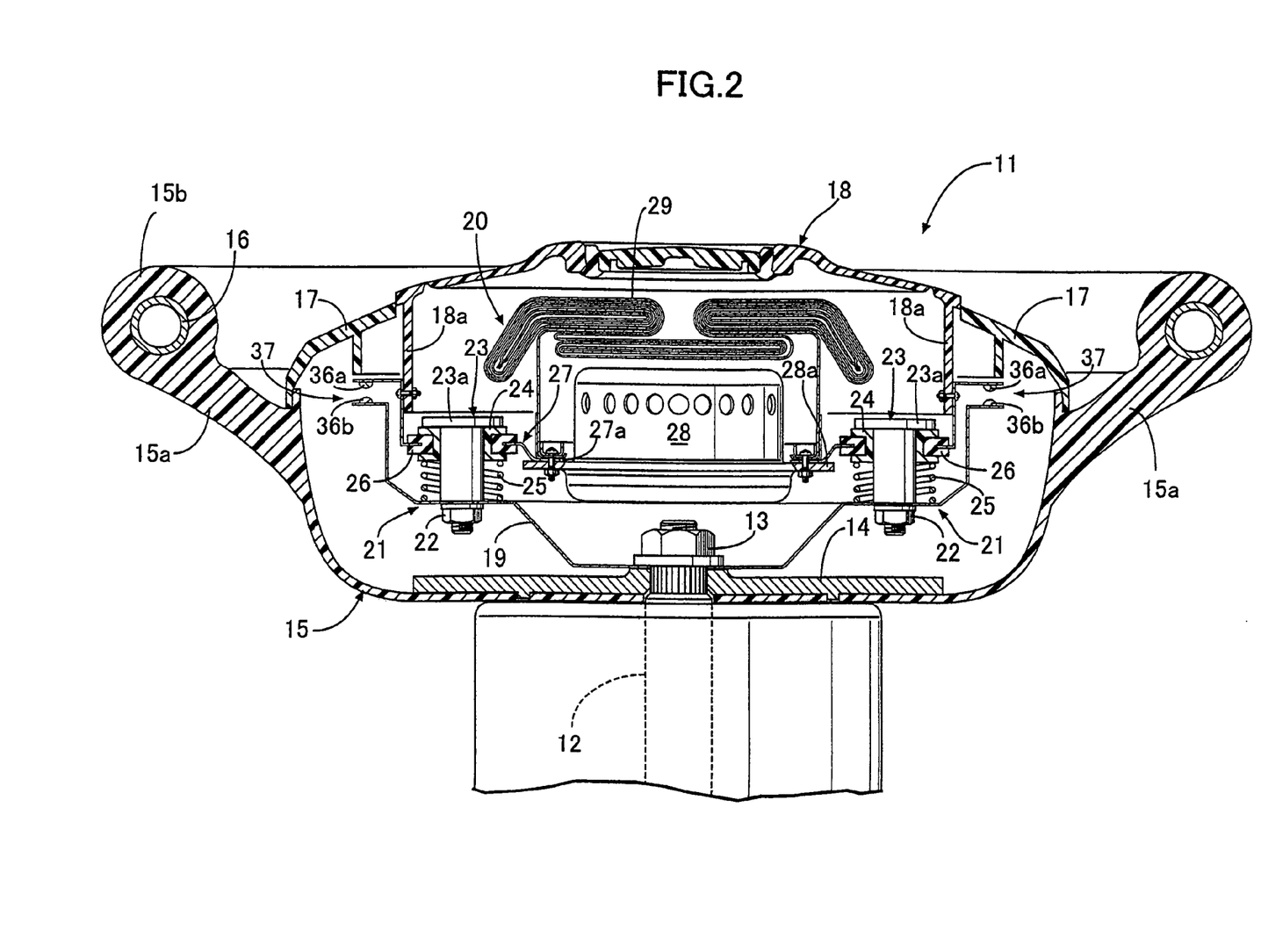
FIG. 2 is an enlarged sectional view along line 2-2 in FIG. 1.

As illustrated in FIG. 1 and FIG. 2, a steering wheel 11 of an automobile includes a boss member 14, which is made of a disk-shaped metal plate, and which is spline-fitted to a rear end of a steering shaft 12 extending downward from a vehicle interior to the front of a vehicle body, and which is fastened thereto with a nut 13. A cover member 15, which has a container-like shape with an opening rear face, is fixed to cover a front face of the boss member 14. Four spoke portions 15a ... extend integrally from outer peripheral portions of the cover member 15 outwardly in radial directions, and an annular rim portion 15b is integrally formed on tip ends of the spoke portions 15a .... A metal ring 16 for reinforcement is buried inside the rim portion 15b. Rear faces of the four spoke portions 15a ... are covered respectively with spoke-portion covers 17 ..., and a steering pad 18 is disposed on the inner side of the spoke-portion covers 17 .... A holder 19 made of a metal plate has a center portion fastened together with and to the rear face of the boss member 14, and an air bag module 20 is supported on the holder 19 via three floating support portions 21 ....

It should be noted that, in the specification, the direction of the axis is defined to refer to a longitudinal direction of the steering shaft 12, and the directions perpendicular to the axis are defined to refer to directions perpendicular to the longitudinal direction of the steering shaft 12.

Figure 3:
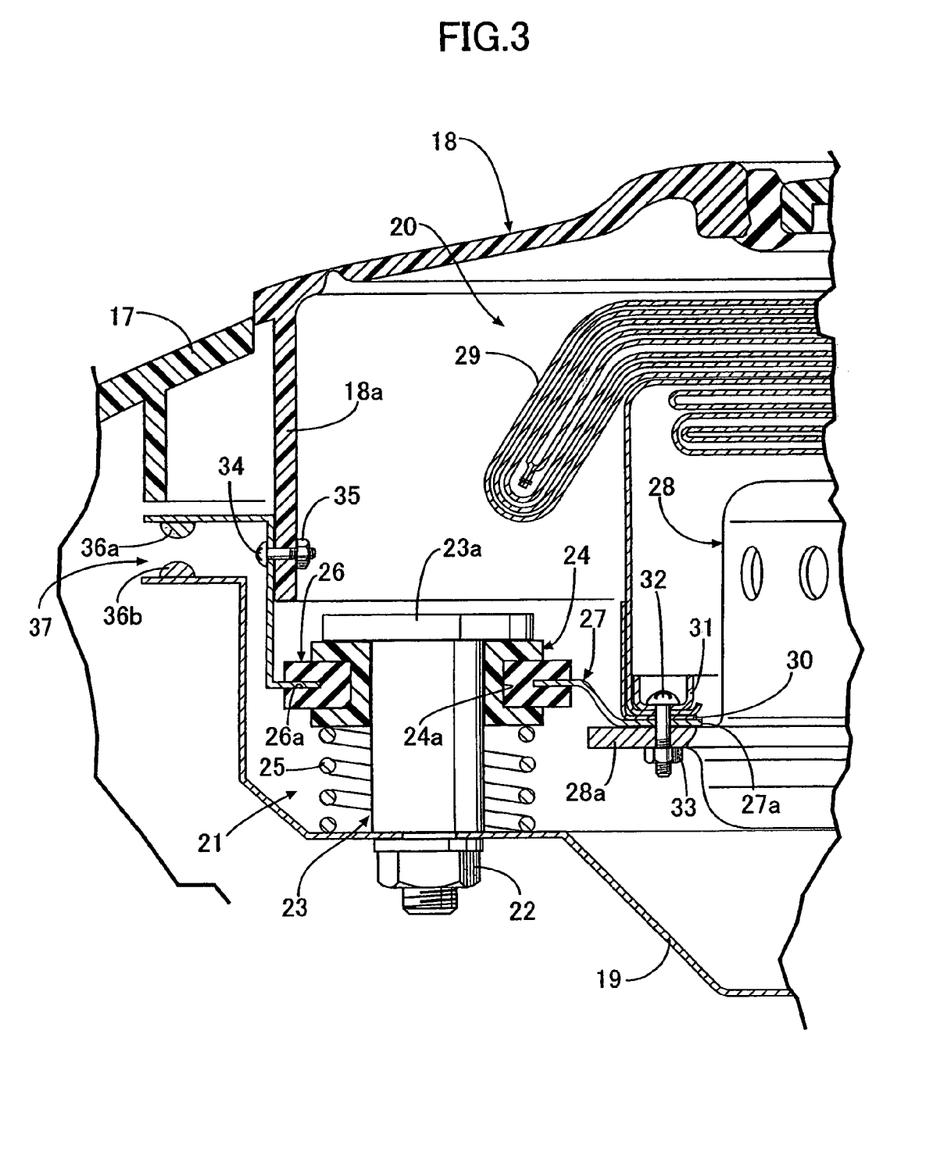
FIG. 3 is an enlarged view of an essential part in FIG. 2.

As is clear from FIG. 2 and FIG. 3, the three floating support portions 21 ..., which support the air bag module 20 on the holder 19, are provided as follows: two respectively at the right and left sides on the upper part, and one at the middle on the lower part, when the steering shaft 12 is taken as the center. These three floating support portions 21 ... are all have the same structure. FIG. 2 illustrates the two floating support portions 21, 21 respectively at the right and left sides on the upper part of the steering shaft 12.

Each floating support 21 includes a guide shaft 23, which penetrates the holder 19 from the rear to the front thereof, and is then fastened thereto with a nut 22. A slider 24, which is fitted slidably between the rear face of the holder 19 and a flange 23a formed at the rear end of the guide shaft 23, is urged in a direction to abut on the flange 23a by a coil spring 25 fitted on the outer periphery of the guide shaft 23. An annular damper spring 26 made of rubber is fitted into a groove 24a formed in the outer periphery of the slider 24, and a bracket 27 made of a metal plate is fitted in a groove 26a formed in the outer periphery of the damper spring 26. Note that the number of brackets 27 is one, and that the bracket 27 is elastically supported by the three damper springs 26 ... of the respective three floating support portions 21 ... It will be understood from FIGS. 2-4; and also from FIGS. 6, 8 and 9 that, in the vibration reducing structure of the present invention, the first elastic body (the coil spring 25) and the second elastic body (the damper spring 26) are arranged coaxially. Also, it will be understood from FIGS. 2-4 and 6 that the vibration reducing structure of the present invention includes a two-plate structure having the holder 19 and the bracket 27. The first elastic body 25 is supported by the holder 19. The mass 20 is supported on the slider 24 via the second elastic body 26 and the bracket 27.

The air bag module 20 includes an inflator 28, which generates a high-pressure gas, and an air bag 29, which is disposed in such a way as to be folded on the rear of the inflator 28. A flange 28a provided on the outer periphery of the inflator 28; a first retainer 30; an open end of the air bag 29; and a second retainer 31 are overlapped with an opening portion 27a formed in the middle portion of the bracket 27, and fastened together with bolts 32 ... and nuts 33 ....

A joint portion 18a extending forward from an outer peripheral portion of the steering pad 18 is fixed to an outer peripheral portion of the bracket 27 with bolts 34 ... and nuts 35 ..., so that the steering pad 18 covers the back of the folded air bag 29 in this state. A plurality of movable contact points 36a ... provided, facing forward, on the outer peripheral portion of the bracket 27 are opposed to fixed contact points 36b ... provided, facing backward, on the outer peripheral surface of the holder 19, so as to be capable of coming into contact therewith. These movable contact points 36a ... and fixed contact points 36b ... constitute a horn switch 37.

Next, the operation of the embodiment of the present invention having the above-mentioned arrangement is now explained.

Figure 4:
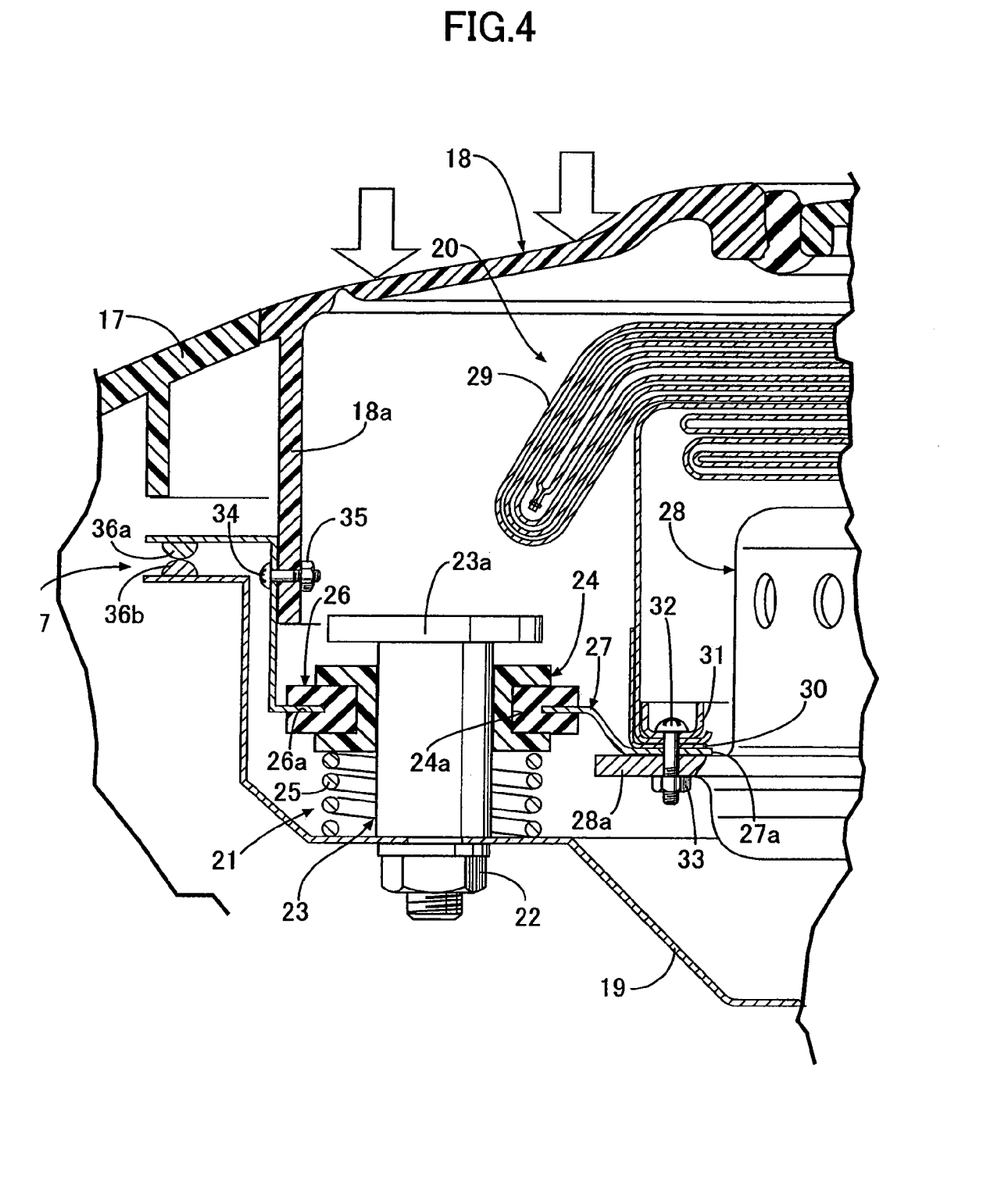
FIG. 4 is an action explanatory view corresponding to FIG. 3.

As illustrated in FIG. 4, when an upper right portion, an upper left portion, or a lower middle portion of the steering pad 18 of the steering wheel 11 is pressed in order to activate an unillustrated horn, the slider 24 advances, while compressing the coil spring 25, along a corresponding one of the three guide shafts 23 ..., which are fixed to the holder 19. The movable contact point 36a provided on the bracket 27 supported on the slider 24 via the damper springs 26 is thereby brought into contact with the corresponding fixed contact point 36b provided on the holder 19, so that the horn is made electrically conductive to a battery so as to sound.

Meanwhile, if vibration of the engine or vibration from a road surface is transmitted to the steering wheel 11 via the steering shaft 12, such vibration causes the hands of the driver gripping the steering wheel 11 to vibrate, eventually causing discomfort. For this reason, the vibration of the steering wheel 11 is reduced with a dynamic damper. The dynamic damper is one in which a mass is supported on a vibration body via an elastic body. In this embodiment, the air bag module 20 (in particular, the inflator 28 having a large weight therein) is caused to function as the mass, and the damper springs 26 ..., which supports the air bag module 20 on the respective guide shafts 23 ... with the bracket 27, are caused to function as the elastic body. Causing the air bag module 20 to function as the mass of the dynamic damper in this way eliminates the need of providing a dedicated mass, and thus is advantageous in terms of the number of components, the weight, the installation space, and the cost.

The dynamic damper in this embodiment reduces vibration of the steering wheel 11 in the directions perpendicular to the axis (for example, the A-A' direction and the B-B' direction in FIG. 1). The vibration damping characteristic of the dynamic damper is determined by the weight of the air bag module 20 as the mass and the spring constant of the damper springs 26 as the elastic body. Here, since the coil springs 25, which support the air bag module 20 in the direction of the axis in a floating manner, are not elastically deformed in the directions perpendicular to the axis, the coil springs 25 do not contribute to the vibration damping characteristic of the dynamic damper.

Accordingly, the spring constant of the coil springs 25 may be set only to prevent malfunction due to vibration of the horn switch 37 comprising the movable contact points 36a . . . and fixed contact points 36b . . . , or to achieve satisfactory operational feeling. As a result, the flexibility in design of the coil springs 25 is significantly improved. On the other hand, since the spring constant of the damper springs 26 in this embodiment may be set with a focus on only the vibration damping characteristic of the dynamic damper, the flexibility in design of the damper springs 26 is significantly improved.

Specifically, the spring constants of the damper springs 26 made of rubber in the directions perpendicular to the axis can be adjusted as desired by changing the rigidity or thickness of the damper springs 26 in the circumferential direction. Accordingly, it is possible to set, independently from the operational characteristic of the horn switch 37 (the spring constant of the coil springs 25), the characteristic of the dynamic damper in reducing the vibration of the steering wheel 11 in the up-and-down direction (the A-A' direction in FIG. 1), or the characteristic of the dynamic damper in reducing the vibration of the steering wheel 11 in the lateral direction (the B-B' direction in FIG. 1), for example. As a result, it is possible to effectively reduce the vibration of the steering wheel 11 in the directions perpendicular to the axis.

Figure 5A:
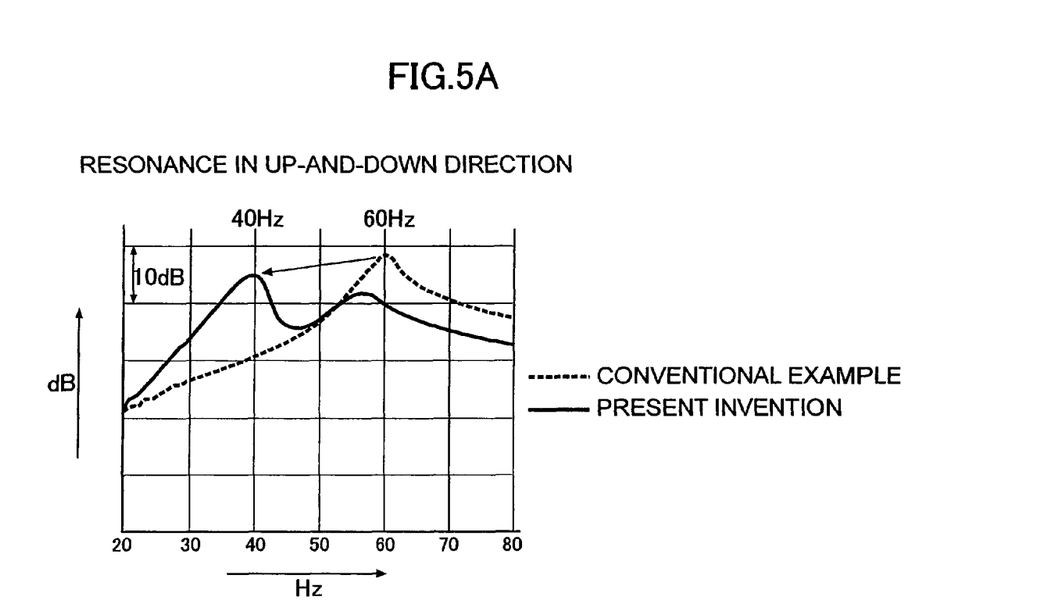
FIGS. 5A and 5B are graphs showing a difference of a spring characteristic between a conventional example and the embodiment.

A graph of FIG. 5A shows the resonance frequency of the air bag module 20 in the up-and-down direction in both of a conventional example (see the dashed line) and the embodiment (see the solid line). According to the embodiment, reducing the resonance frequency from 60 Hz to 40 Hz by tuning the spring constant of the damper springs 26 makes it possible to reduce the vibration of the steering wheel 11 in the up-and-down direction with the dynamic damper caused to effectively function.

Figure 5B:
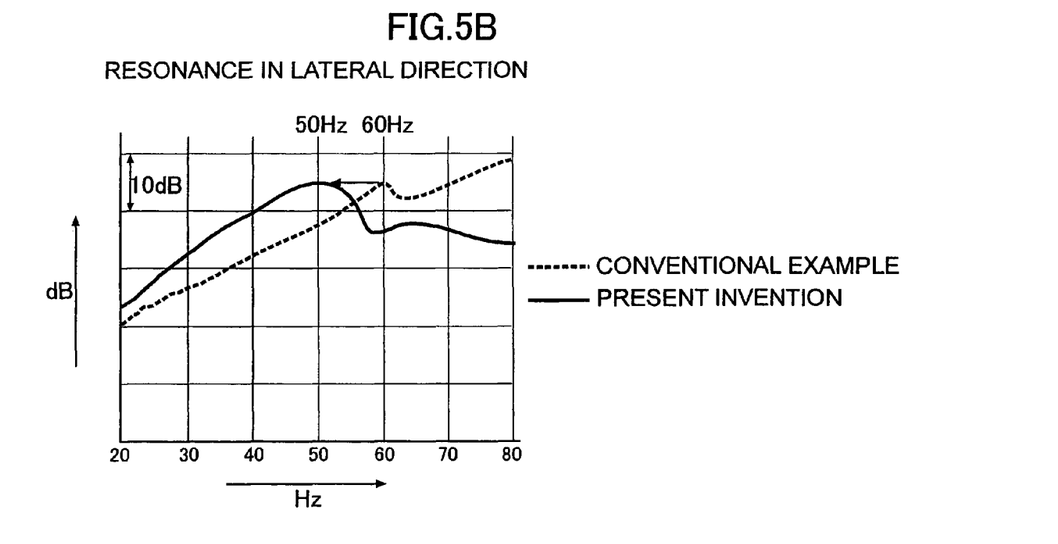

A graph of FIG. 5B shows the resonance frequency of the air bag module 20 in the lateral direction in both of a conventional example (see the dashed line) and the embodiment (see the solid line). According to the embodiment, reducing the resonance frequency from 60 Hz to 50 Hz by tuning the spring constant of the damper springs 26 makes it possible to reduce the vibration of the steering wheel 11 in the lateral direction with the dynamic damper caused to effectively function.

Needless to say, in any of the above cases, effect of the spring constant of the coil springs 25 is basically unnecessary to be considered in tuning the spring constant of the damper springs 26. Accordingly, it is possible to optimally tune the operational characteristic of the horn switch 37 as well.

Figure 6:
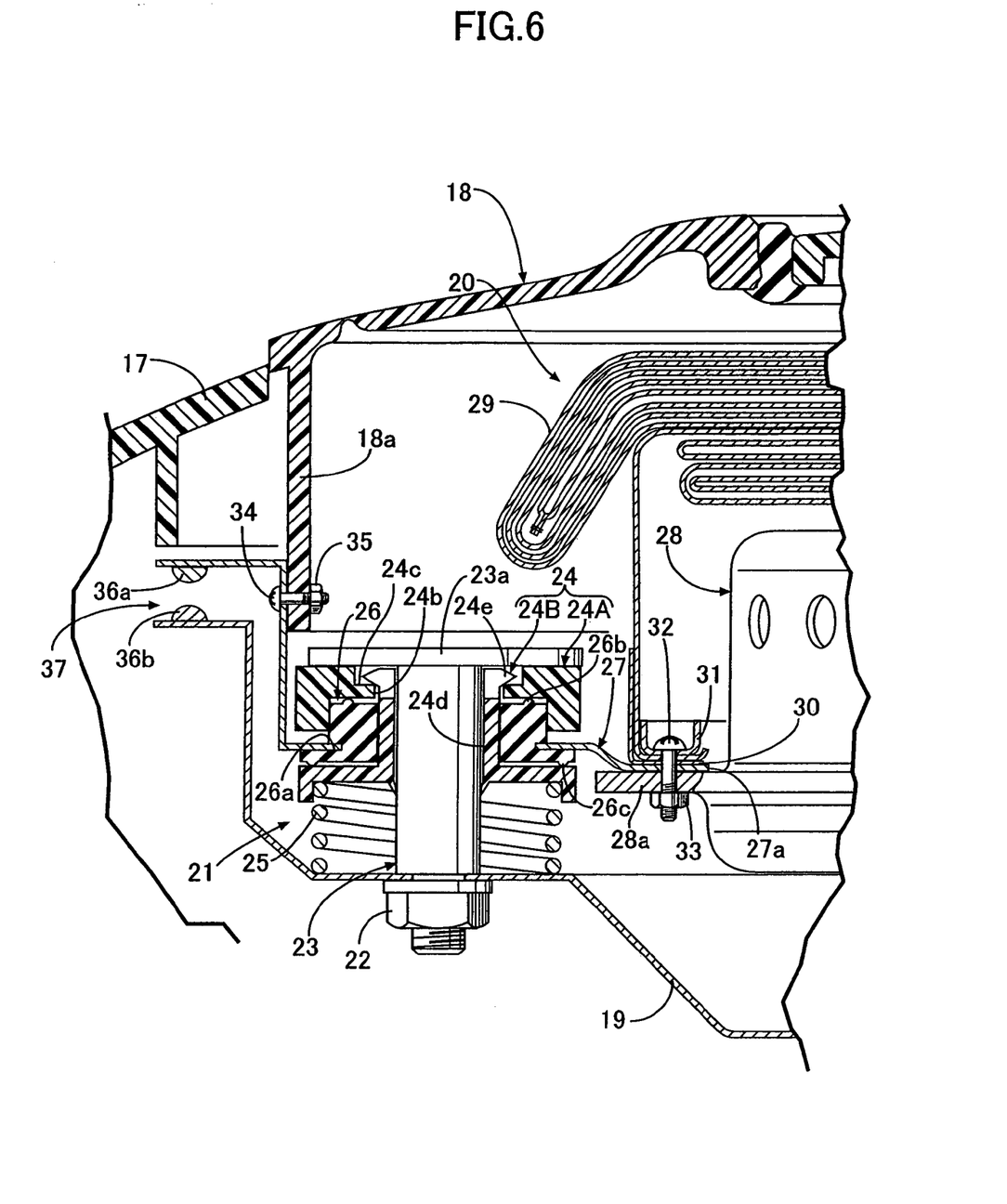
FIG. 6 is a view corresponding to FIG. 3.
Figure 7:
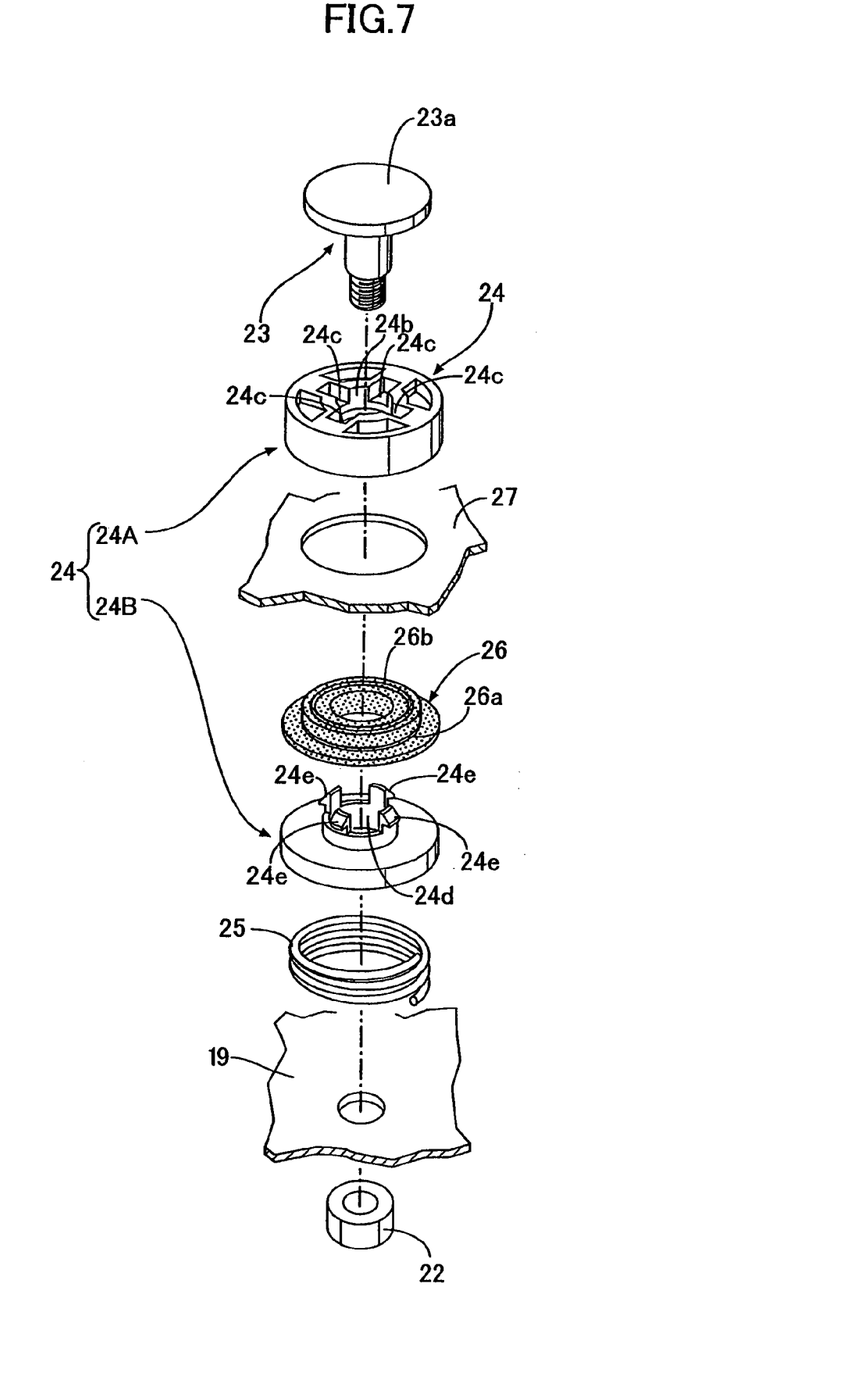
FIG. 7 is an exploded perspective view of an essential part.

Next, a second embodiment of the present invention will be explained based on FIGS. 6 and 7.

The second embodiment is characterized by the configuration of a slider 24 and a damper spring 26 of a floating support portion 21. The configurations of the other portions are the same as those in the above-described first embodiment.

The slider 24 of the second embodiment is separated into two parts: a first slider half body 24A and a second slider half body 24B. The first slider half body 24A includes a through-hole 24b loosely fitted onto a periphery of a guide shaft 23, and four locking grooves 24c . . . formed by cutting out the periphery of the through-hole 24b. The upper surface of the first slider half body 24A abuts on the lower surface of a flange 23a of the guide shaft 23. The second slider half body 24B includes a through-hole 24d slidably fitted onto the periphery of the guide shaft 23, and four locking claws 24e . . . protruding from the periphery of the through-hole 24d in the direction of the axis. The lower surface of the second slider half body 24B abuts on the upper end of the coil spring 25.

The first slider half body 24A and the second slider half body 24B are integrated together with the damper spring 26 interposed therebetween in such a way that the four locking claws 24e . . . of the second slider half body 24B are engaged respectively with the four locking grooves 24c . . . of the first slider half body 24A. The through-hole 24d of the second slider half body 24B is slidably supported on the outer peripheral surface of the guide shaft 23.

The damper spring 26 having a groove 26a supported by a bracket 27 includes annular protrusions 26b and 26c respectively on the upper surface and the lower surface thereof. The protrusion 26b on the upper surface abuts on the lower surface of the first slider half body 24A, while the protrusion 26c on the lower surface abuts on the upper surface of the second slider half body 24B.

According to the second embodiment, the slider half body 24 is separated into two parts: the first slider half body 24A and the second slider half body 24B, which can be coupled to and separated from each other. Accordingly, the assemblability in interposing the damper spring 26 therebetween is significantly improved.

In addition, the protrusions 26b and 26c provided on the upper surface and the lower surface of the damper spring 26 abut on the first slider half body 24A and the second slider half body 24B, respectively. Accordingly, when the air bag module 20 as the mass vibrates in the direction of the axis, the protrusions 26b and 26c of the damper spring 26 are easily elastically deformed, so that a low resonance frequency can be achieved. With this, even if the spring constant of the coil springs 25 is set to be high in order to prevent malfunction of the horn switch 37, it is possible to cause the air bag module 20 to vibrate at a low resonance frequency in the direction of the axis, thus functioning as the dynamic damper reducing the vibration of the steering wheel 11 in the direction of the axis.

In this event, since the heights of the protrusions 26b and 26c of the damper spring 26 are small, there is no possibility that the horn switch 37 malfunctions even when the protrusions 26b and 26c are compressed and deformed.

Figure 8:
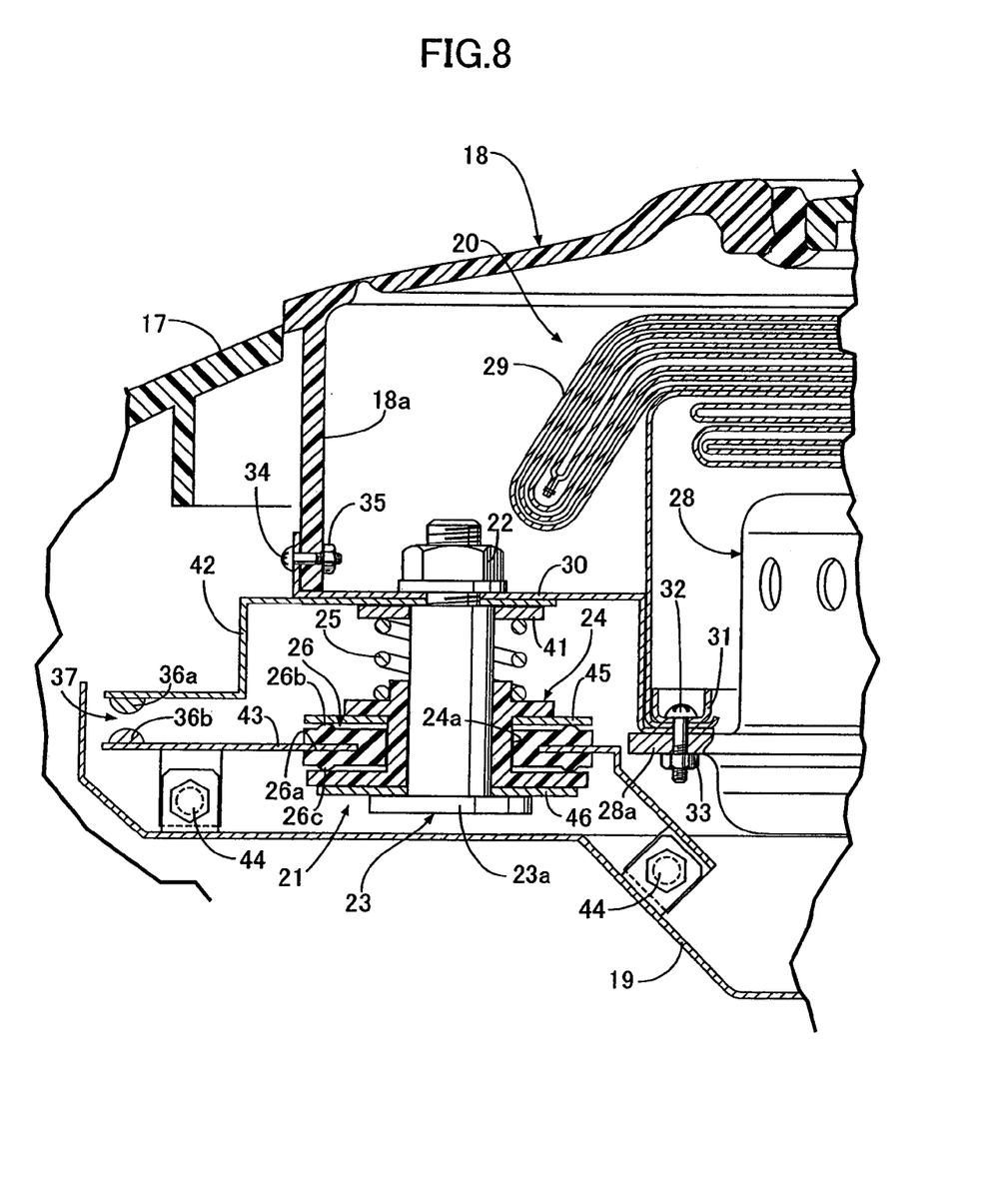
FIG. 8 is a view, corresponding to FIG. 3, according to a third embodiment of the present invention.

Next, a third embodiment of the present invention will be explained based on FIG. 8.

In the above-described first and second embodiments, the guide shafts 23 are supported on the holder 19 side, while the damper springs 26 are supported on the air bag module 20 side. In the third embodiment, guide shafts 23 are supported on the air bag module 20 side, while damper springs 26 are supported on the holder 19 side.

Specifically, a first retainer 30 has an inner peripheral portion fixed to a flange 28a of an inflator 28 with bolts 32 . . . and nuts 33 . . . , and an outer peripheral portion fixed to a joint portion 18a of a steering pad 18 with bolts 34 . . . and nuts 35 . . . . Each guide shaft 23 penetrates a first stay 42 and the first retainer 30, and is fastened thereto with a nut 22, so as to be supported on the air bag module 20 side. The first stay 42 is provided with movable settings 36a of a horn switch 37.

On the other hand, a second stay 43 is fixed to the holder 19 with bolts 44 . . . . A groove 26a of the damper spring 26 is supported by the second stay 43, and fixed contact points 36b facing the movable settings 36a are provided on the second stay 43. The damper spring 26 is fitted into a groove 24a of a slider 24, which is slidably fitted onto the guide shaft 23, and a washer 45 is disposed between the upper surface of the damper spring 26 and the slider 24. The damper spring 26 is provided with annular protrusions 26b and 26c protruding respectively from the upper surface and the lower surface thereof. The protrusion 26b on the upper surface abuts on the washer 45, while the protrusion 26c on the lower surface abuts on the slider 24. A washer 41 is disposed between the upper end of the coil spring 25 and the first stay 42, and a washer 46 is disposed between the lower surface of the slider 24 and the upper surface of a flange 23a of the guide shaft 23.

According to this embodiment, when an upper right portion, an upper left portion, or a lower middle portion of the steering pad 18 of the steering wheel 11 is pressed in order to activate an unillustrated horn, the guide shaft 23, which is guided by the slider 24 supported on the holder 19 via the second stay 43 and the damper spring 26, moves together with the first stay 42 while compressing the coil spring 25. The movable contact point 36a provided on the first stay 42 is thereby brought into contact with the corresponding fixed contact point 36b provided on the second stay 43, so that the horn is made electrically conductive to a battery so as to sound.

When vibration in the directions perpendicular to the axis is inputted to the steering wheel 11, the damper spring 26 is elastically deformed in the radial direction, so that the air bag module 20 functions as the mass of the dynamic damper, in the same manner as that of the first embodiment. Further, when vibration in the direction of the axis is inputted to the steering wheel 11, the protrusions 26b and 26c of the damper spring 26 are elastically deformed, so that the air bag module 20 vibrates at a low resonance frequency in the direction of the axis so as to function as the dynamic damper, in the same manner as that of the second embodiment.

Figure 9:
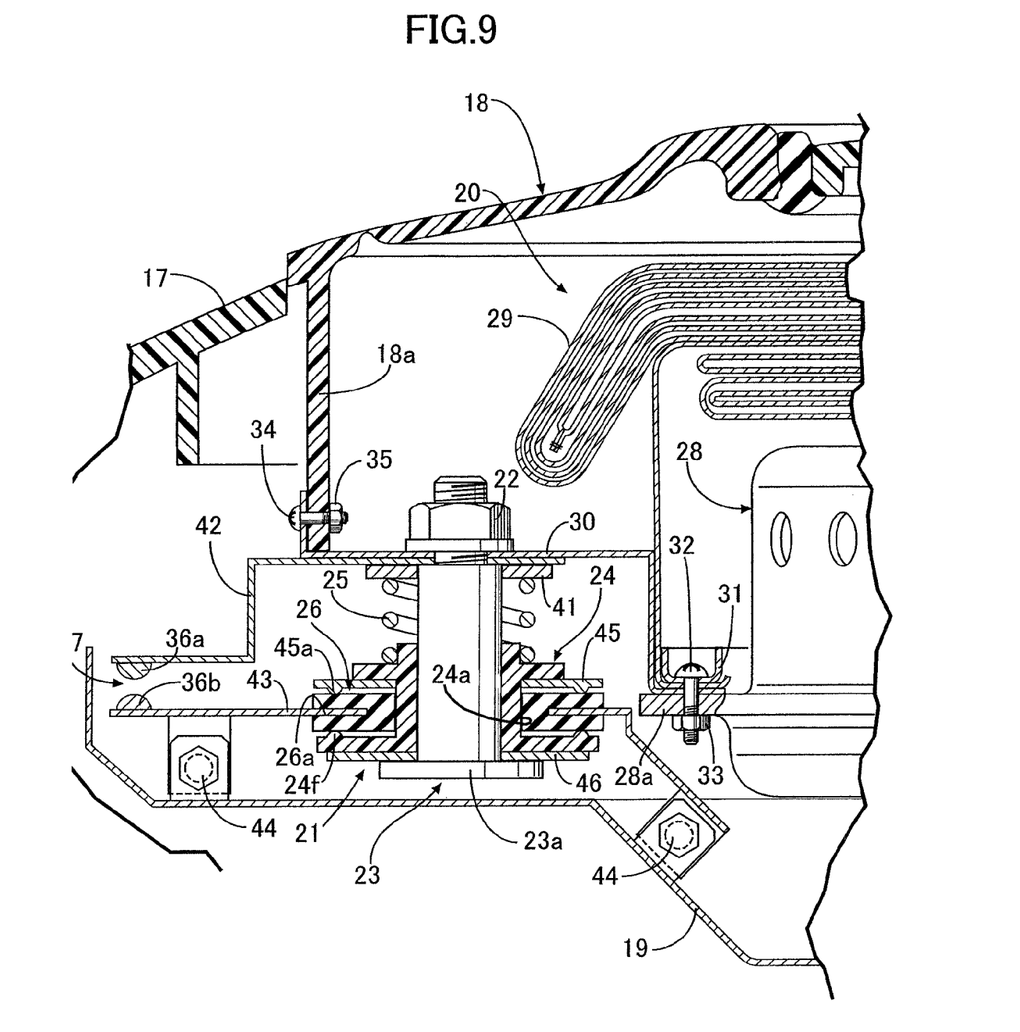
FIG. 9 is a view, corresponding to FIG. 3, according to a fourth embodiment of the present invention.

Next, a fourth embodiment of the present invention will be explained based on FIG. 9.

While the protrusions 26b and 26c are provided respectively on the upper and lower surfaces of the damper spring 26 in the third embodiment, protrusions 45a and 24f are provided on a washer 45 and a slider 24 opposed respectively to upper and lower surfaces of a damper spring 26 in the fourth embodiment. According to this embodiment, the damper spring 26 is easily elastically deformed with the protrusions 45a and 24f, so that an air bag module 20 vibrates at a low resonance frequency in the direction of the axis so as to function as a dynamic damper. As a result, it is possible to achieve the same operational effects as those of the third embodiment.

Embodiments of the present invention are explained above, but the present invention may be modified in a variety of ways as long as the modifications do not depart from the gist of the present invention.

For example, although the air bag module 20 is utilized as the mass of the dynamic damper in the embodiments, a dedicated mass may be provided for the dynamic damper.

In addition, although the damper springs 26 are made of rubber in the embodiments, the damper springs 26 may be formed of any kind of elastic body such as a spring.

Moreover, although the damper springs 26 are formed to have a circular cross section in the embodiments, the damper springs 26 may be formed to have a non-circular cross section such as a rectangle. This configuration makes it possible to more easily set the spring constants of the damper springs 26 in the up-and-down direction and the lateral direction.

Note that the "directions perpendicular to the axis" in the specification are not limited to directions intersecting the "direction of the axis" precisely at 90° but include directions intersecting the "direction of the axis" substantially at 90°.

The invention claimed is:

1. A vibration reducing structure for a steering wheel, comprising
    a two-plate structure comprising a holder and a bracket;
    a mass which is supported inside the steering wheel via an elastic body so as to be movable in a direction of an axis and directions perpendicular to the axis, wherein a horn switch is activated by pressing the mass in the direction of the axis, and the mass is allowed to vibrate in the directions perpendicular to the axis to function as a dynamic damper, wherein
    the elastic body comprises a first elastic body and a second elastic body, said first elastic body being supported by said holder;
    a slider is supported on a fixed portion of the steering wheel via the first elastic body so as to be movable in the direction of the axis, said slider disposed adjacent said first elastic body,
    the mass is supported on the slider via the second elastic body and the bracket so as to be movable in the directions perpendicular to the axis, and
    the first elastic body and the second elastic body are arranged coaxially; wherein said second elastic body has a protrusion formed thereon, said protrusion protruding in an axial direction of the second elastic body such that said protrusion abuts a surface of said slider that is transverse to the axial direction.

2. The vibration reducing structure for a steering wheel according to claim 1, wherein the directions perpendicular to the axis of the steering wheel comprise an up-and-down direction and a lateral direction perpendicular to the up-and-down direction, and the second elastic body is of an annular shape and has different spring constants respectively in the up-and-down direction and the lateral direction thereof, wherein the different spring constants of the second elastic body are achieved by changing at least one of a rigidity and a thickness of the second elastic body.

3. The vibration reducing structure for a steering wheel according to claim 1, wherein the mass is an air bag module.

4. The vibration reducing structure for a steering wheel according to claim 2, wherein the mass is an air bag module.

5. The vibration reducing structure for a steering wheel according to claim 1, wherein said slider has a groove formed therein; and wherein said second elastic body is fitted in said groove of the slider.

6. The vibration reducing structure for a steering wheel according to claim 1, wherein a sub-assembly of the second elastic body and the slider is disposed above said first elastic body.

7. A vibration reducing structure for a steering wheel having a boss member and an airbag module arranged therein, said vibration reducing structure comprising
    a two-plate structure comprising a holder supported by the boss member; and a bracket supporting said airbag module;
    a plurality of floating support portions arranged on the holder;

each of said floating support portions comprising
a first elastic body supported on the holder;
a slider supported by the first elastic body, said slider having an annular groove formed therein at an outer periphery thereof; and
a second elastic body fitted in said groove of the slider;
wherein
said slider is movable in an axial direction thereof;
said airbag module is supported inside the steering wheel via said plurality of floating support portions and the bracket such that said airbag module is movable in an axial direction of the steering wheel and in directions perpendicular to the axial direction; and
wherein said second elastic body has a protrusion formed thereon, said protrusion protruding in an axial direction of the second elastic body such that said protrusion abuts a surface of said slider that is transverse to the axial direction.

8. The vibration reducing structure for a steering wheel according to claim 7, wherein the directions perpendicular to the axial direction of the steering wheel comprise an up-and-down direction and a lateral direction perpendicular to the up-and-down direction, and the second elastic body has different spring constants respectively in the up-and-down direction and the lateral direction thereof for adjusting resonance frequency of the airbag module in the up-and-down direction and the lateral direction thereby to reduce vibration of the steering wheel during operation thereof.

9. A vibration reducing structure for a steering wheel, comprising
a two-plate structure comprising a holder and a bracket, each having a contact point;
a mass which is supported inside the steering wheel via an elastic body so as to be movable in a direction of an axis and a direction perpendicular to the axis, wherein a horn switch comprising the contact points of said holder and said bracket is activated by pressing the mass in the direction of the axis so as to establish contact between the contact points of said holder and said bracket and the mass is allowed to vibrate in the direction perpendicular to the axis to function as a dynamic damper, wherein
the elastic body comprises a first elastic body and a second elastic body,
a slider is supported on a fixed portion of the steering wheel and
the mass is supported on the slider via the second elastic body and the bracket so as to be movable in the direction perpendicular to the axis,
the slider is supported via the second elastic body, and
a washer is disposed into a groove of the slider between the second elastic body and the slider; said second elastic body has a protrusion formed thereon, said protrusion protruding in an axial direction of the second elastic body such that said protrusion abuts said washer.

10. The vibration reducing structure for a steering wheel according to claim 9, wherein the direction perpendicular to the axis of the steering wheel comprises an up-and-down direction and a lateral direction, and the second elastic body has different spring constants respectively in the up-and-down direction and the lateral direction, wherein the different spring constants of the second elastic body are achieved by changing at least one of a rigidity and a thickness of the second elastic body.

11. The vibration reducing structure for a steering wheel according to claim 9, wherein the mass is an air bag module.

12. The vibration reducing structure for a steering wheel according to claim 10, wherein the mass is an air bag module.

13. The vibration reducing structure for a steering wheel according to claim 9, wherein said washer is positioned axially outside of an axial end portion of the second elastic body.

14. The vibration reducing structure for a steering wheel according to claim 10, wherein said washer is positioned axially outside of an axial end portion of the second elastic body.

15. The vibration reducing structure for a steering wheel according to claim 11, wherein said washer is positioned axially outside of an axial end portion of the second elastic body.

16. The vibration reducing structure for a steering wheel according to claim 9, wherein the second elastic body and the washer have central bore portions, the central bore portions having equal diameters, which are equal to the diameter of the groove of the slider.

17. The vibration reducing structure for a steering wheel according to claim 10, wherein the second elastic body and the washer have central bore portions, the central bore portions having equal diameters, which are equal to the diameter of the groove of the slider.

18. The vibration reducing structure for a steering wheel according to claim 11, wherein the second elastic body and the washer have central bore portions, the central bore portions having equal diameters, which are equal to the diameter of the groove of the slider.

19. The vibration reducing structure for a steering wheel according to claim 13, wherein the second elastic body and the washer have central bore portions, the central bore portions having equal diameters, which are equal to the diameter of the groove of the slider.

20. The vibration reducing structure for a steering wheel according to claim 15, wherein the second elastic body and the washer have central bore portions, the central bore portions having equal diameters, which are equal to the diameter of the groove of the slider.

* * * * *